Oct. 6, 1970    W. G. GELUSHIA ET AL    3,532,986
ELECTRIC WARNING SYSTEM FOR VEHICLES
Filed March 18, 1968    2 Sheets-Sheet 1

INVENTORS
Warren G. Gelushia
Gilbert A. Ilbery &
Dalton L. Smith
BY
John A. Mawhinney
ATTORNEY

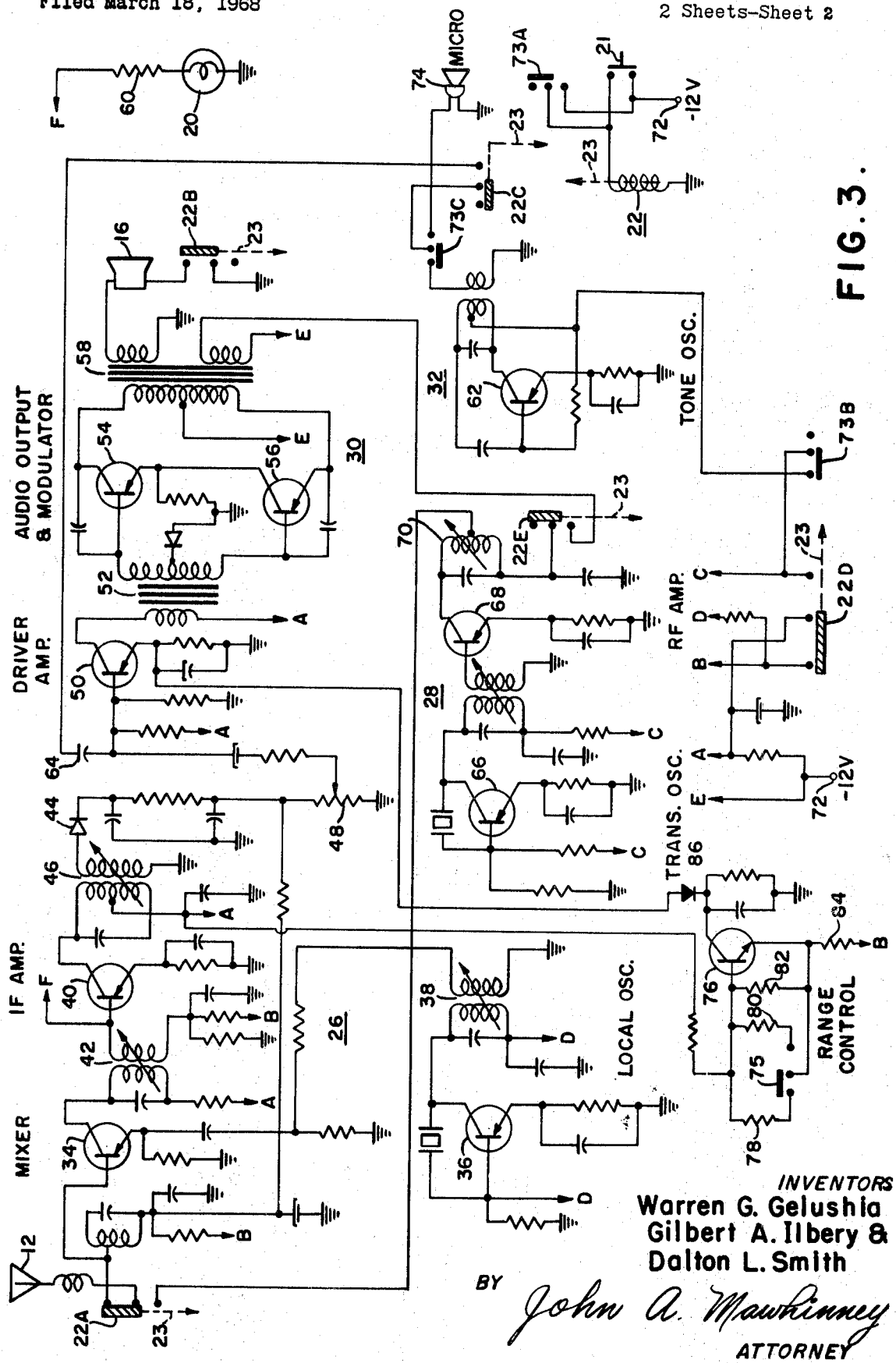

United States Patent Office
3,532,986
Patented Oct. 6, 1970

3,532,986
ELECTRIC WARNING SYSTEM FOR VEHICLES
Warren G. Gelushia, 113 N. Emberwood, Robinson, Tex. 76706; Gilbert A. Ilbery, 3300 Lyle St., Waco, Tex. 76707; and Dalton L. Smith, 310 Live Oak St., Marlin, Tex. 76661
Filed Mar. 18, 1968. Ser. No. 713,607
Int. Cl. H04b 1/44
U.S. Cl. 325—21
8 Claims

ABSTRACT OF THE DISCLOSURE

An electronic warning system for vehicles wherein each vehicle is equipped with a transceiver apparatus including selective means for varying the useful range of operation, whereby the operators of said vehicles can both warn and be warned by other vehicles of impending danger. Additionally, circuitry is provided when desirable for voice communication on selected transceiver apparatus, for example, law enforcement units which would permit a law enforcement officer to communicate with all other vehicles within range of said law enforcement unit.

CROSS-REFERENCE TO RELATED APPLICATIONS

This invention is an improvement on a related application for which a patent was applied for by the subject inventors on Sept. 9, 1966, entitled "Electronic Warning System for Vehicles" and identified as Ser. No. 578,308. That invention has matured into U.S. Pat. 3,371,278 having issued on Feb. 27, 1968.

BACKGROUND OF THE INVENTION

This invention is directed generally to the vehicular warning systems for warning a vehicle operator of an impending danger due to the hazardous proximity of another vehicle, particularly one which is moving. Systems are known which provide for a radio transmitter to be located at a fixed site of hazardous or restricted operation so that a warning signal is radiated in all directions. A radio receiver is installed in each moving vehicle and is responsive to the radiated signal from the transmitter so as to energize an operator alarm within the vehicle when it has entered the radiation field of the transmitter, thereby alerting the operator of a hazardous condition at that site.

In U.S. Pat. No. 3,371,278, referred to above, a combined transmitter-receiver (transceiver) is located in each vehicle such as an automobile, bus or any other conveyance that would come in contact with another vehicle in a similar mode of travel. The transceiver is adapted to operate normally in a receive mode of operation such that upon reception of a signal of predetermined frequency, an audio and visual alarm will be provided to the operator. A momentary operator-actuated switch is coupled to the transceiver for momentarily rendering the receiver portion inoperative while rendering the transmitter portion operative to transmit a signal of said predetermined frequency so that the receiver portion of another vehicle will be responsive thereto. The transmitter portion includes an audio tone oscillator which is used to modulate the carrier frequency of the transmitter portion when energized. This tone frequency is demodulated by the receiver portion of another vehicle and provides audio signal which is coupled to a transducer such as a loudspeaker for providing an alarm signal to the operator. The operator in each vehicle then will momentarily actuate the switch when he senses an impending danger due to the proximity of another vehicle at which time his normally operative receiver section will be de-energized and an alarm signal will be transmitted from the transmitter portion to the receiver portion of all of the other vehicles within range. Additionally, each transceiver includes a unified output and modulator transformer having a single primary winding and a pair of secondary windings wherein one of the secondary windings is coupled to the transmitter portion of the apparatus while the other secondary winding is coupled to the receiver transducer, being selectively coupled and decoupled thereto by means of the momentary actuated switch.

SUMMARY OF THE INVENTION

Briefly, the subject invention is an improvement on transceiver apparatus of the type described having a unified output and modulator transformer and now additionally includes microphone means and a second momentary actuated switch for de-energizing the audio tone oscillator and coupling said microphone to said audio output and modulator transformer while momentarily rendering the receiver portion inoperative but at the same time rendering the transmitter portion operative to transmit a voice communication to other vehicles whose respective receiver portions will be responsive thereto, and additionally including manually selective range control means coupled into the receiver portion for selectively adjusting the receiver sensitivity for predetermined ranges of operation.

BRIEF DESCRIPTION OF THE DRAWINGS

FIG. 3 is a schematic diagram of the preferred embodiment of the subject invention.

DESCRIPTION OF THE PREFERRED EMBODIMENT

Figure 1:
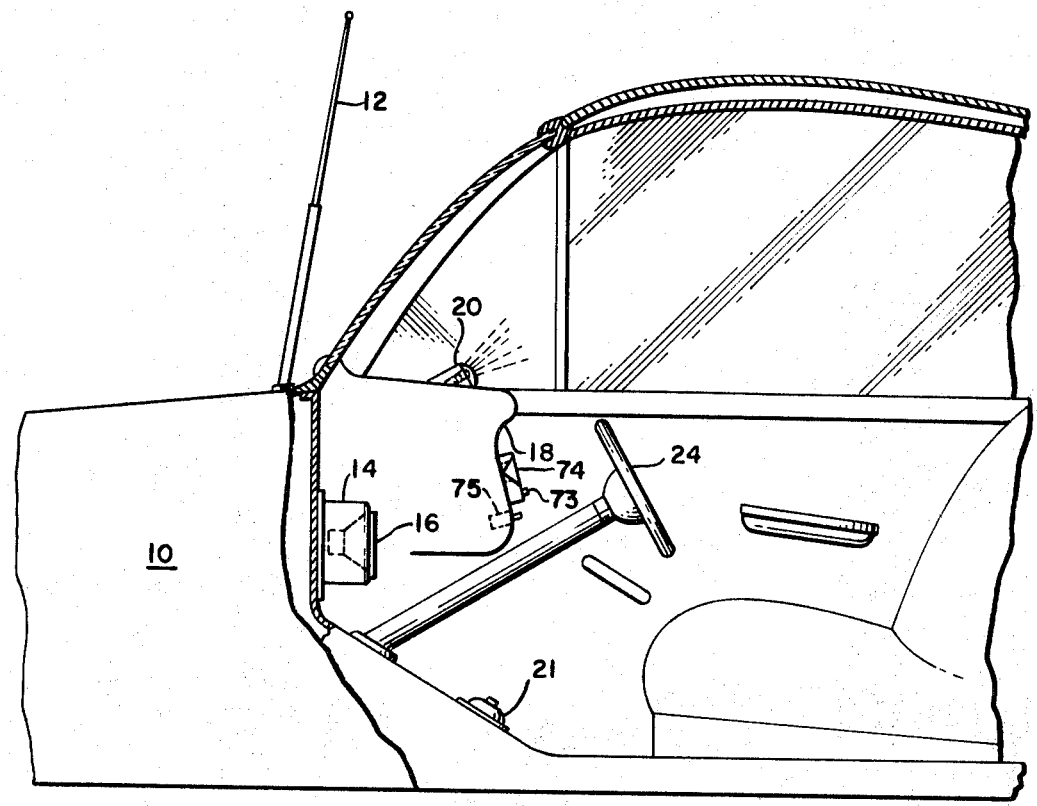
FIG. 1 is a fragmentary view of a vehicle such as an automobile including the subject invention incorporated therein.

Referring now to the drawings and more particularly to FIG. 1, a vehicle 10 such as an automobile has an antenna 12 mounted thereon. The antenna is typical of the type presently in use for commercial broadcast receivers utilized in automobiles. Reference numeral 14 generally discloses the housing which is adapted to include the electronic circuitry embodying the subject invention as well as an audio transducer such as a loudspeaker. The housing unit 14 is shown located beneath the dashboard 18 on the fire wall. A visual indicator such as a blinking lamp 20 is located on the top portion of the dashboard so as to be in view of the operator, not shown. Also shown mounted on the dashboard is a microphone 74 including a hand-depressed momentary actuation switch 73. Additionally, a range control switch 75 for selectively changing the range sensitivity of the electronic circuitry embodying the subject invention is also shown located on the dashboard for easy access by the operator. A foot-depressed momentary actuation switch 21 of the push-button type is shown located on the floorboard of the vehicle 10 so that it is within easy reach of the operator.

It should be understood that this configuration is shown by way of example only and it is not meant to be considered in a limiting sense since the switch 21 when desirable may be located on the steering column of the steering wheel 24. It might also be desirable to mount the microphone 74 and the visual indicator 20 at some other location on the vehicle.

Figure 2:
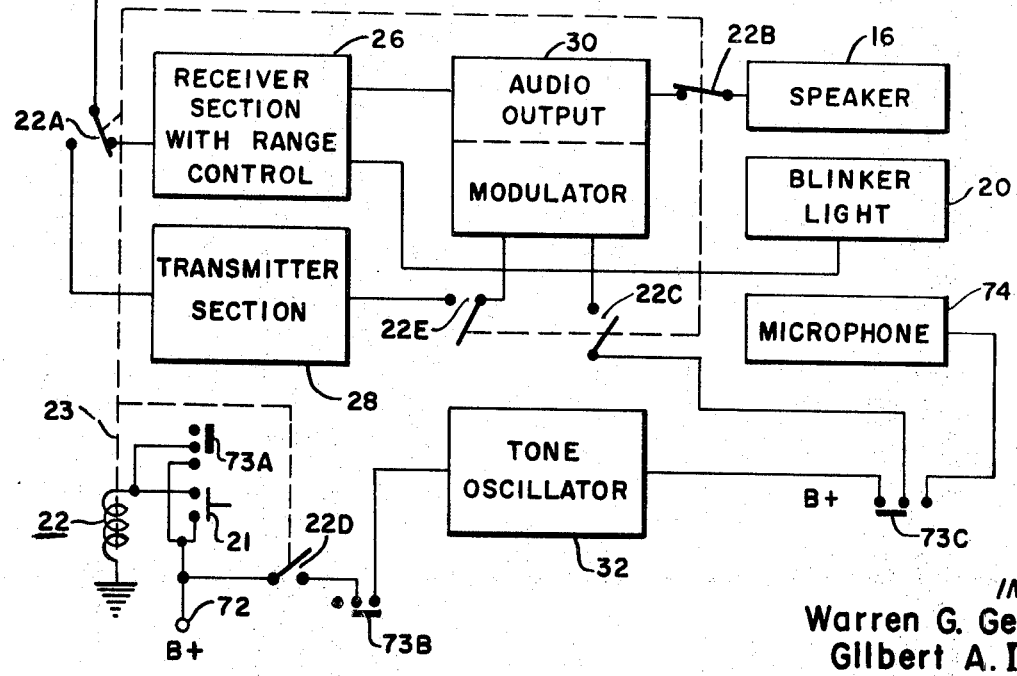
FIG. 2 is an electrical block diagram of the preferred embodiment of the subject invention.

Directing attention now to the block diagram shown in FIG. 2, reference numeral 12 schematically represents the antenna shown in FIG. 1 and is coupled to a receiver section 26 including selective range control and a transmitter section 28 by means of switch section 22A which is one switch element of a multi-ganged two-positioned solenoid actuated switch 22 energized by means of the push-button momentary actuated switch 21. The switch 21 is adapted to couple a D.C. voltage (B+) coupled to terminal 72 across the solenoid of the switch 22. A mechanical connection between the switch elements 22A–22E is provided by the armature 23 which is illustrated schematically. The solenoid actuated switch 22 is adapted to have a first and second state of operation corresponding to the normally de-energized and intermittent energized condition, respectively. The switch sections 22A–22E are shown in the first or de-energized position. FIG. 2 therefore illustrates switch section 22A coupling antenna 12 to the receiver section 26 by means of the normally closed contacts thereof while the normally open contacts are coupled to the transmitter section 28. The receiver section is coupled to an audio output and modulator section 30 which is then coupled to loudspeaker 16 by means of the normally closed switch contacts of switch section 22B. The visual indicator comprising the blinker light 20 is also adapted to be coupled back to the receiver section 26. The audio output and modulator section 30 will be described in detail subsequently; however, it should be pointed out that it is contemplated that it is intended to operate as an audio output amplifier in the receive mode of operation, but as a modulator circuit in the transmit mode.

An audio tone oscillator 32 and a microphone 74 are adapted to be coupled to the audio output and modulator circuit 30 by means of the switch contact section 22C energized by the push-button switch 21 and the momentary actuated switch 73. More specifically, the audio tone oscillator 32 is coupled to the audio output and modulator circuit by means of the normally open switch contacts 22C and the normally closed switch contacts 73C while the microphone is coupled to the audio output and modulator circuit by means of the normally open contacts of switch contacts 73C and the normally open switch contact section 22C. A supply voltage (B+) is adapted to be coupled to the tone oscillator 32 by means of the normally open switch contact section 22D and the normally closed switch contact section 73B. The normally open switch contact section 73A is adapted to couple the supply voltage B+ across the solenoid switch 22 when closed in the same manner as push-button switch 21. The transmitter section 28 is shown coupled to the audio and modulator circuit 30 through the normally open switch contact section 22E.

In operation, the apparatus is adapted to operate normally as a receiver such that when a signal is received from another vehicle by means of the antenna 12, the receiver section including a local oscillator, mixer, and IF section, not shown, acts to demodulate the received signal which is then fed to the audio output circuit 30 and to the speaker 16 by means of the normally closed switch contact section 22B. The blinker light 22 is additionally actuated by the receiver section 26 upon reception of a signal at the antenna 12 to provide a visual indication of a received signal.

When the operator senses an impending danger from other vehicles in the vicinity, the switch 21 is depressed momentarily energizing the solenoid actuated switch 22 whereupon the antenna 12 is coupled to the transmitter section 28. The speaker 16 is uncoupled from the audio output and modulator circuit 30 while the audio tone oscillator 32 is turned on by means of supply potential being coupled thereto through the now closed switch contact section 22D. The audio tone oscillator produces a fixed frequency output which is coupled to the audio output and modulator circuit 30 through the now closed contacts of switch sections 22C and 73C and thence to the transmitter section 28 by means of the switch contact section 22E which is also now closed. The fixed frequency output from the audio tone oscillator 32 is used to modulate the carrier signal from the transmitter section 28 and is radiated to other vehicles by means of the antenna 12.

When it is desirable to provide selective voice communication to other vehicles in the vicinity, such as when it is desirable for a low enforcement office to communicate verbally with an offender as well as alerting all other vehicles in the vicinity as to the conditions necessary for more easily apprehending the offender, the law enforcement officer's transceiver would be equipped with a microphone 74 which is activated by closing the switch 73. Monetarily actuating switch 73 simultaneously energizes the solenoid actuated switch 22, de-energizes and uncouples the tone oscillator 32 from the audio output modulator section 30, and couples the microphone 74 to the transmitter section 28 by means of the closed switch contact sections 22C, 22E and 73C.

The system contemplated then is a combined transmitter-receiver system which is normally operated in the received mode so as to be responsive to warning signals from other vehicles. In the event, however, that the operator is aware of an impending danger, he merely depresses the switch 21 which de-activates the receiver while simultaneously activating his own transmitter which in turn transmits warning signals to other vehicles. Additionally, selected systems are additionally equipped with a microphone 74 and a momentary actuated switch 73 which is operable to de-activate the tone oscillator 32 and couple a voice communication signal to the audio output modulator circuit 30 and the transmitter section 28. Additionally, range control is provided in the receiver section 26 for varying receiver sensitivity.

Referring now to FIG. 3, the schematic disclosed illustrates what is at present considered to be the preferred embodiment of the subject invention. The antenna 12 is coupled to a mixer circuit including transistor 34 by means of switch contact section 22A. A crystal controlled local oscillator including transistor 36 is coupled to the emitter circuit of transistor 34 by means of transformer 38. The action of the mixer and local oscillator produces an IF signal which is coupled to an IF amplifier including transistor 40 by means of transformer 42. The amplified IF signal is coupled to diode 44 by means of transformer 46. Diode 44 acts as a detector to provide an audio frequency (AF) across the potentiometer 48. The circuitry including the mixer, local oscillator, IF amplifier and diode detector comprises the receiver section 26 illustrated in FIG. 2. The audio frequency signal is coupled to a driver amplifier including transistor 50. The output of the driver amplifier is coupled to the audio output and modulator circuit 30 compising transformer 52, the push-pull amplifier including transistors 54 and 56 and the unified audio output and modulator transformer 58 comprised of a primary and two secondary windings. One secondary winding of the output transformer 58 is coupled to one side of the speaker 16 which has the other side thereof connected to the switch contact section 22B. A visual alarm comprising a blinking light 20 is coupled back to the base of the transformer 40 by means of resistor 60.

An audio tone oscillator circuit 32 including transistor 62 is coupled back to the input of the driver amplifier comprising transistor 50 by means of the normally closed contacts of switch section 73C, switch section 22C and capacitor 64. The transmitter section 28 is comprised of a crystal controlled oscillator including transistor 66 which is coupled to an RF amplifier including transistor 68. The other secondary winding of the unified audio output and modulated transformer 58 is coupled to the collector circuit of transistor 68 by means of switch section 22E. The output of the RF amplifier is adapted to be coupled to the antenna 12 by means of the switch section 22A connected to the RF output coil 70. The microphone 74 is adapted to be coupled to the input of the transistor 50 by means of the coupling capacitor 64 and the switch section 22C when the switch 73 and more specifically switch contact section 73C is energized. As mentioned above, switch section 73A energizes the solenoid actuated switch 22 causing the normally open switch contacts to close. Actuation of switch 73 additionally causes switch contact section 73B to provide an open circuit of supply potential to the tone oscillator 32.

FIG. 3 includes a terminal 72 which is adapted to be connected to a source of D.C. power supply voltage (−12 volts). The power supply voltage applied to terminal 72 is adapted to be applied to voltage points A, B, C, D and E in a selected manner in accordance with the position of switch section 22D; however, it should be noted that the voltage at points A and E are constantly applied.

A range control circuit for selectively changing the receiver sensitivity of the receiver section 26 is provided by the range control switch 75, the transistor 76 and the combination of base bias resistors 78, 80 and 82. An emitter resistor 84 is coupled from the emitter of transistor 76 to the voltage point B being applied through switch contact section 22D. The range control switch 75 is adapted to connect either resistor 78 or 80 in parallel with the fixed resistor 82. The base of transistor 76 is directly coupled to the center tap of the primary winding of transformer 46. This circuit combination depending upon the position of switch 75 changes the bias level of transistor 76 so that it is normally non-conductive but when the signal level across the primary winding of transformer 46 reaches a predetermined amplitude indicative of signal level, transistor 76 will become conductive. The collector of transistor 76 is coupled to the emitter of the driver amplifier transistor 50 by means of a diode 86. Upon the occurrence of transistor 76 becoming conductive, the driver amplifier 50 becomes inoperative preventing any further signal transfer through the succeeding circuitry. By selectively choosing the component values of resistors 78, 80 and 82 as well as the emitter resistor 84, it is possible to control the sensitivity of the receiver section so that it is responsive to signals within a 200 foot range (Short Range) for use in city driving and approximately one-half mile (Long Range) when traveling at relatively higher speeds on highways and freeways, etc.

Summarizing, the transmitter section 28 and the tone oscillator 32 are inoperative when the switch 21 is in its normally open position. However the receiver section 26, the driver amplifier 50 and the audio output amplifier including transistors 54 and 56 are operative to act as a receiver of an alarm signal which produces an audio alarm at the speaker 16. When the switch 21 is momentarily actuated, the solenoid actuated switch 22 will be energized, the mixer 34, the local oscillator 36 and the IF amplifier 40 are rendered inoperative and a power supply voltage is coupled to the audio tone oscillator 32 and the transmitter oscillator including transistor 66. The output of the tone oscillator is now coupled to the driver amplifier 50 and the push-pull amplifier including transistors 54, 56 are injected into the collector circuit of transistor 68 by means of a secondary winding of the unified audio output and modulator transformer 58. The carrier frequency of the transmitter oscillator is modulated by the signal from the tone oscillator 32 and is coupled to the antenna 12 through switch section 22A. In addition, when switch 73 is momentarily closed, the tone oscillator 32 is de-energized and the microphone 74 is coupled into the transmitter circuitry whereupon the carrier frequency of the transmitter oscillator is modulated by a voice signal from the microphone and is coupled to the antenna through switch section 22A.

The frequencies of the transmitter oscillator and the local oscillator are selected so that the receiver portion of all the other vehicles are responsive to the carrier frequency of the transmitter portion of any other vehicle. Moreover, the oscillators are crystal controlled with stability. The frequency of the tone oscillator is adapted to operate in the audio range such that when it is received by a receiver and translated to its respective loudspeaker, a tone or voice will be heard which will over-ride any background noise present in the vehicle.

What has been shown and described therefore is a transceiver installed in each auto or other vehicle so that both transmits and receives signals which are indicative of impending danger and is additionally provided with microphone apparatus for selective voice communications to other vehicles.

While there has been shown and described what is considered at present to be the preferred embodiment of the invention, modifications thereto will readily occur to those skilled in the art. It is not desired therefore that the invention be limited to the specific arrangement shown and described but it is to be understood that all equivalents, alterations and modifications within the spirit and scope of the invention are herein meant to be included.

We claim:
1. An electronic warning system for vehicles whereby the operators of said vehicles can both warn and be warned by other vehicles of approaching or ensuing danger, comprising in combination:

antenna apparatus mounted on a vehicle and adapted to operate both as a transmitting and a receiving antenna;

radio transceiver apparatus, including a receiver section and a transmitter section, mounted on said vehicle and coupled to said antenna apparatus, being operable to selectively act as either a receiver or a transmitter of radio signals, both sections being selectively tuned to the substantially same frequency such that said receiver section of one vehicle is responsive to signals from said transmitter section of another vehicle;

first switch means, having a first or normally steady state and a second or intermittent state of operation, coupled to said radio transceiver apparatus and being adapted to be operated by said operator of said vehicle causing said radio transceiver apparatus to operate as a receiver when said first switch means is in said first state of operation and as a transmiter when said first switch means is in said second state of operation;

an audio output and modulator transformer, having a primary winding and a pair of secondary windings;

circuit means coupling said primary winding to said receiver section;

an audio signal oscillator being normally inoperative when said first switch means is in said first state but becoming operative when said first switch means is in said second state of operation;

a microphone for providing a voice communication signal;

second switch means, having a first or normally steady state and a second or intermittent state of operation when energized, coupled to said microphone and said radio transceiver apparatus and being adapted by said operator of said vehicle to couple said microphone into said tranceiver apparatus when said second switch means is in said second state of operation and including circuit means coupled to said first switch means to render said first switch means to its second state when said second switch means is in its second state and circuit means coupling said microphone to said primary winding of said audio output and modulator transformer when said second switch means is in said second state of operation;

circuit means coupling said audio tone signal oscillator to said primary winding of said audio output and modulator transformer through said first and second switch means when said first switch means only is in said second state of operation;

circuit means coupled to said second switch means for rendering said audio tone signal oscillator inoperative when said second switch means is in its second state of operation;

circuit means coupling one of said pair of secondary windings to said transmitter section through said first switch means when said first switch means is in said second state of operation;

and transducer means coupled to the other secondary winding of said pair of secondary windings being operative only when said first switch means is in said first state of operation for communicating an audio tone signal or a voice communication signal from another vehicle to the operator of said vehicle.

2. The invention as defined by claim 1 wherein said first switch means comprises a momentary actuation switch and a solenoid operated switch having a solenoid coupled to said momentary actuation switch and adapted to be energized thereby when actuated, and wherein said solenoid actuated switch includes a plurality of switch contact sections.

3. The invention as defined by claim 2 wherein said second switch means is coupled to said solenoid actuated switch and being operable to energize said solenoid actuated switch when in said second state of operation.

4. The invention as defined by claim 1 and additionally including range control circuit means coupled to said receiver section for varying the sensitivity thereof between predetermined limits.

5. The invention as defined by claim 4 wherein said receiver section includes an IF amplifier and a driver amplifier and wherein said range control circuit means comprises manually selective switch means and signal translation means coupled thereto and being operable to have the conductive state thereof controlled by said manually selective switch means, and circuit means coupling said range control switch means from said IF amplifier ot said driver amplifier.

6. The invention as defined by claim 1 wherein said transducer means comprises a loudspeaker responsive to both said predetermined frequency of said audio oscillator and said voice communication signal from said microphone.

7. The invention as defined by claim 1 and additionally including a visual indicator coupled to said receiver section and being responsive to received signals for providing a visual warning of impending danger.

8. The invention as defined by claim 1 wherein said receiver section and said transmitter section each includes crystal controlled oscillators for maintaining both said sections at a predetermined tuned frequency of opperation.

References Cited

UNITED STATES PATENTS 3,371,278  2/1968  Gelushia et al. _____ 325—64

ROBERT L. GRIFFIN, Primary Examiner

A. H. HANDAL, Assistant Examiner

U.S. Cl. X.R.

325—64; 340—225